(12) United States Patent
Ramasamy

(10) Patent No.: US 10,999,390 B2
(45) Date of Patent: May 4, 2021

(54) METHOD AND SYSTEM FOR MOBILE DATA COMMUNICATION

(71) Applicant: Bank of America Corporation, Charlotte, NC (US)

(72) Inventor: Suki Ramasamy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/541,488

(22) Filed: Aug. 15, 2019

(65) Prior Publication Data

US 2021/0051208 A1 Feb. 18, 2021

(51) Int. Cl.
| | | |
|---|---|---|
| G06F 15/16 | (2006.01) | |
| H04L 29/08 | (2006.01) | |
| G06N 3/08 | (2006.01) | |
| G06K 9/62 | (2006.01) | |
| G06F 9/54 | (2006.01) | |
| G06N 20/00 | (2019.01) | |

(52) U.S. Cl.
CPC .............. *H04L 67/26* (2013.01); *G06F 9/546* (2013.01); *G06K 9/6256* (2013.01); *G06N 3/08* (2013.01); *G06N 20/00* (2019.01); *H04L 67/22* (2013.01)

(58) Field of Classification Search
None
See application file for complete search history.

(56) References Cited

U.S. PATENT DOCUMENTS

| | | | |
|---|---|---|---|
| 7,739,345 B2 | 6/2010 | Heinzel et al. | |
| 8,594,283 B2 | 11/2013 | Hogan et al. | |
| 9,009,307 B2 | 4/2015 | Jain et al. | |
| 9,148,869 B2 | 9/2015 | Van Heerden et al. | |
| 9,219,639 B2 | 12/2015 | Jain et al. | |
| 9,632,984 B2 | 4/2017 | Starikova et al. | |
| 9,672,717 B1 | 6/2017 | Slavin et al. | |
| 10,110,699 B2 | 10/2018 | Kunjithapatham et al. | |
| 2013/0346347 A1* | 12/2013 | Patterson | G06N 20/00 706/12 |
| 2014/0358825 A1* | 12/2014 | Phillipps | G06Q 30/0241 706/11 |
| 2014/0358828 A1* | 12/2014 | Phillipps | G06N 20/00 706/12 |
| 2018/0232659 A1* | 8/2018 | Ranatunga | G06Q 30/02 |
| 2018/0307992 A1* | 10/2018 | Chawla | G06F 16/954 |
| 2019/0182342 A1* | 6/2019 | Goenka | H04L 67/22 |
| 2019/0297040 A1* | 9/2019 | White | H04L 51/08 |
| 2020/0089996 A1* | 3/2020 | Zaifman | G06K 9/6228 |
| 2020/0134083 A1* | 4/2020 | Elliman | G06F 3/0482 |
| 2020/0193313 A1* | 6/2020 | Ghanta | G06N 5/046 |

* cited by examiner

*Primary Examiner* — Phyllis A Book

(74) *Attorney, Agent, or Firm* — Banner & Witcoff, Ltd.; Michael A. Springs

(57) ABSTRACT

Methods, systems, and computing platforms for mobile data communication are disclosed. Processor(s) may be configured to electronically receive a plurality of user mobile interaction data and storing the user mobile interaction data in a computer readable database over a threshold period of interaction time for a mobile device. The processor(s) may be configured to electronically process the user mobile interaction data with a machine learning controller based on a set of machine learning training data including predefined user activity data so as to output at least one most probable time vector. The processor(s) may be configured to electronically output the at least one most probable time vector to a notification processing module.

18 Claims, 8 Drawing Sheets

METHOD AND SYSTEM FOR MOBILE DATA COMMUNICATION

FIELD OF THE DISCLOSURE

The present disclosure relates to methods, systems, and computing platforms for mobile data communication with machine learning.

BACKGROUND

In the internet-of-things era, many digital products can be connected to the internet. Enterprise organizations utilize various computing infrastructure to make decisions and trigger actions. The computing infrastructure may include computer servers, computer networks, and sensors. Such an environment may include the Internet of Things (IoT). Often time, an IoT environment generates a plethora of raw data that can overwhelm an enterprise organization. As the digital economy continues to develop, cybersecurity has become a formidable task in the internet-of-things era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One aspect of the present disclosure relates to a system configured for mobile data communication. The system may include one or more hardware processors configured by machine-readable instructions. The processor(s) may be configured to electronically receive a plurality of user mobile interaction data and storing the user mobile interaction data in a computer readable database over a threshold period of interaction time for a mobile device. The processor(s) may be configured to electronically process the user mobile interaction data with a machine learning controller based on a set of machine learning training data including predefined user activity data so as to output at least one most probable time. The processor(s) may be configured to electronically processing the user mobile interaction data with a machine learning controller based on a set of machine learning training data including predefined user activity data so as to output at least one most probable time vector. The processor(s) may be configured to electronically output the at least one most probable time vector to a notification processing module.

In some implementations of the system and method, the processor(s) may be configured to process the data with a deep machine learning controller. In some implementations of the system and method, the processor(s) may be configured to electronically receive a push notification data element and storing the push notification data element in the notification module.

In some implementations of the system and method, the processor(s) may be configured to process the machine learning training data including at least one mobile usage attribute data element. In some implementations of the system and method, the processor(s) may be configured to process the machine learning training data including at least one user gating attribute data element. In some implementations of the system and method, the processor(s) may be configured to process the machine learning training data including at least one GPS location attribute data element. In some implementations of the system and method, the processor(s) may be configured to process the machine learning training data including at least one music genre attribute data element. In some implementations of the system and method, the processor(s) may be configured to process the machine learning training data including at least one screen time attribute data element. In some implementations of the system and method, the processor(s) may be configured to process the machine learning training data including at least one traveling profile attribute data element. In some implementations of the system and method, the processor(s) may be configured to process the machine learning with a deep machine learning processing module.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
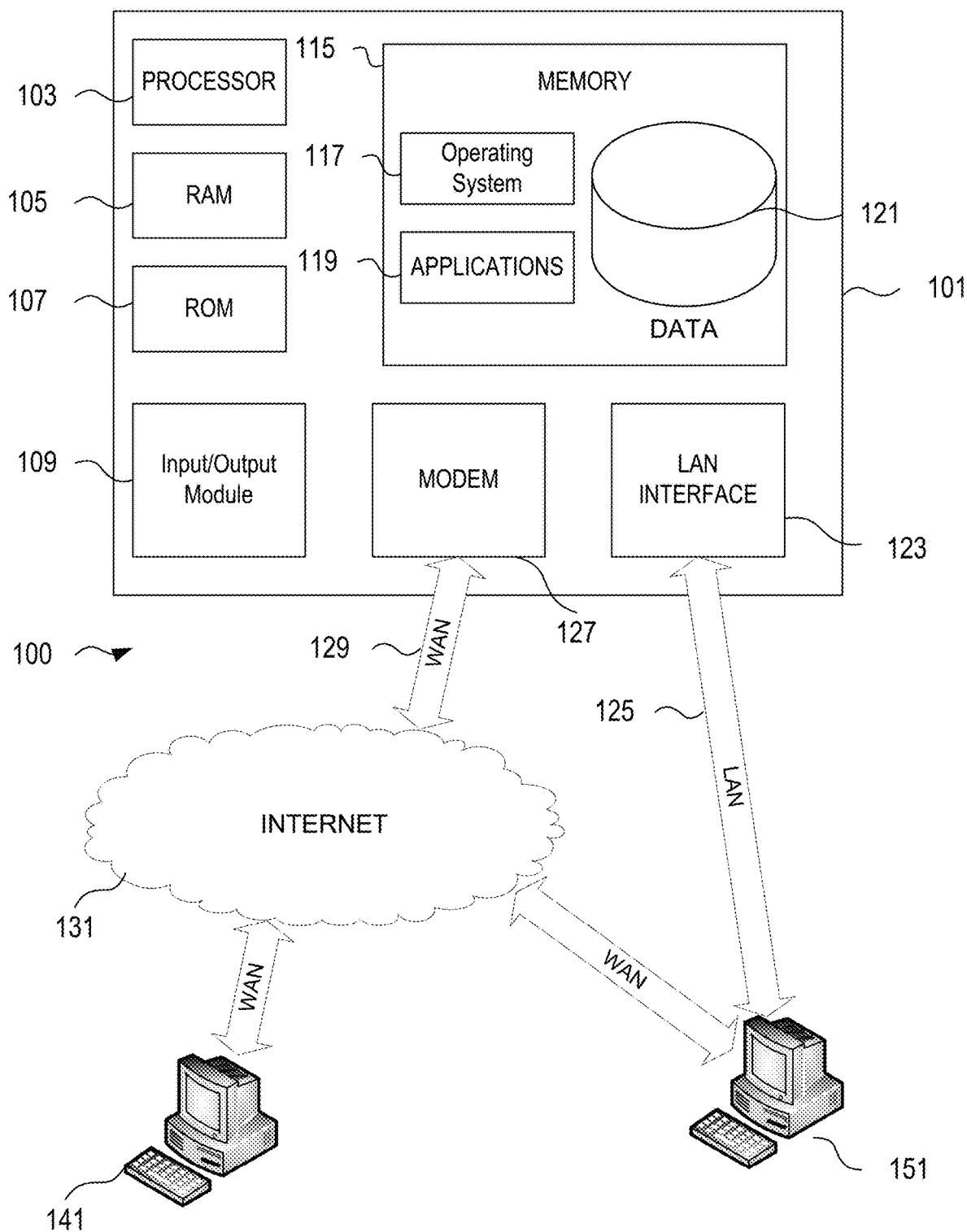
FIG. 1 illustrates a schematic diagram of a digital computing environment in which certain aspects of the present disclosure may be implemented.

FIG. 1 illustrates a block diagram of a specific programmed computing device 101 (e.g., a computer server 100) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
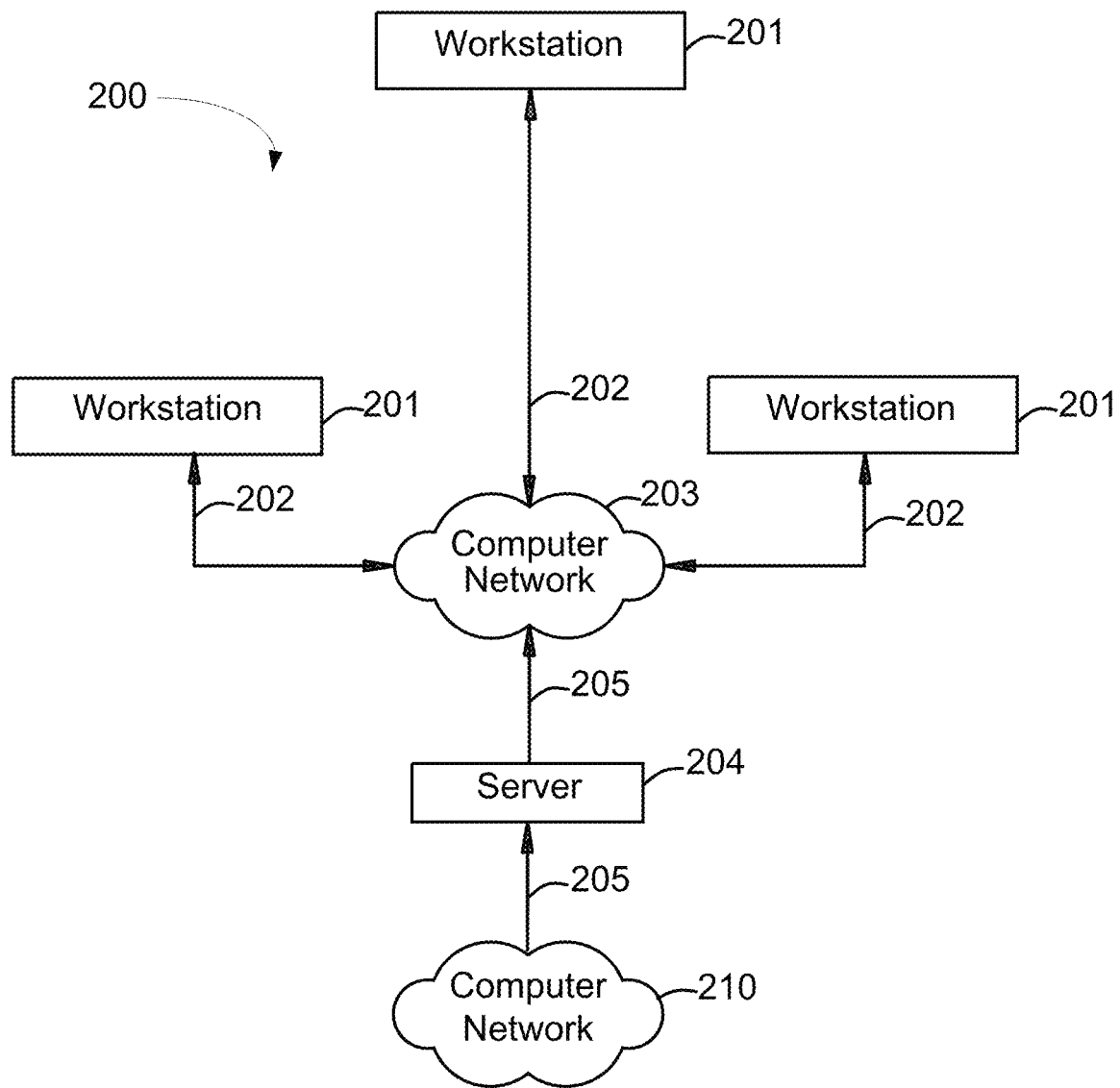
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3:
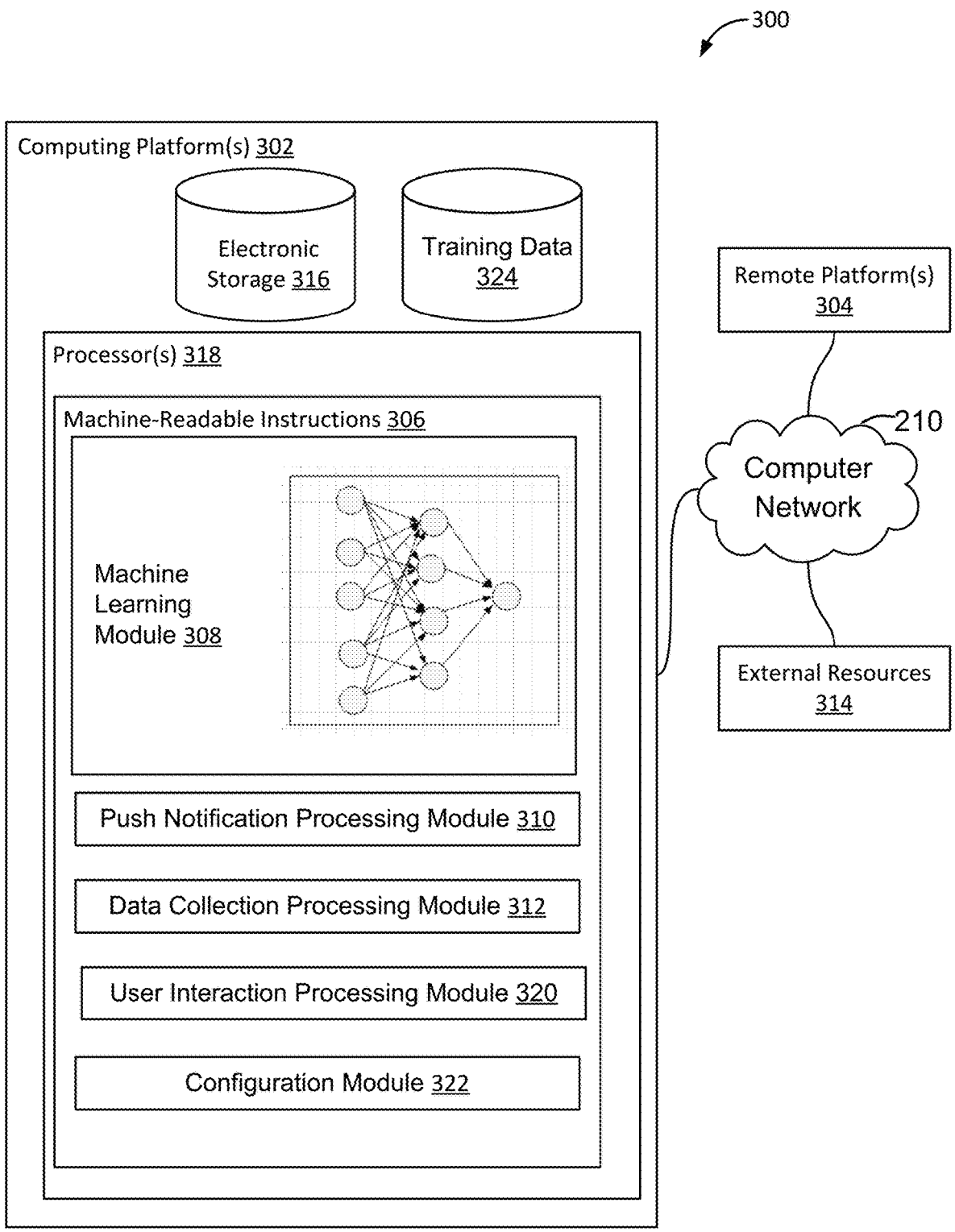
FIG. 3 illustrates a system configured for data communication, in accordance with one or more implementations.

FIG. 3 illustrates a system 300 configured for data communication, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of machine learning module 308, push notification processing module 310, mobile data collection processing module 312, user interaction processing module 320, mobile configuration module 322 and/or other instruction modules.

The modules 308, 310, 312, 320, 322 and other modules implement APIs containing functions/sub-routines which can be executed by another software system, such as email and internet access controls. API denotes an Application Programming Interface. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art.

Figure 5:
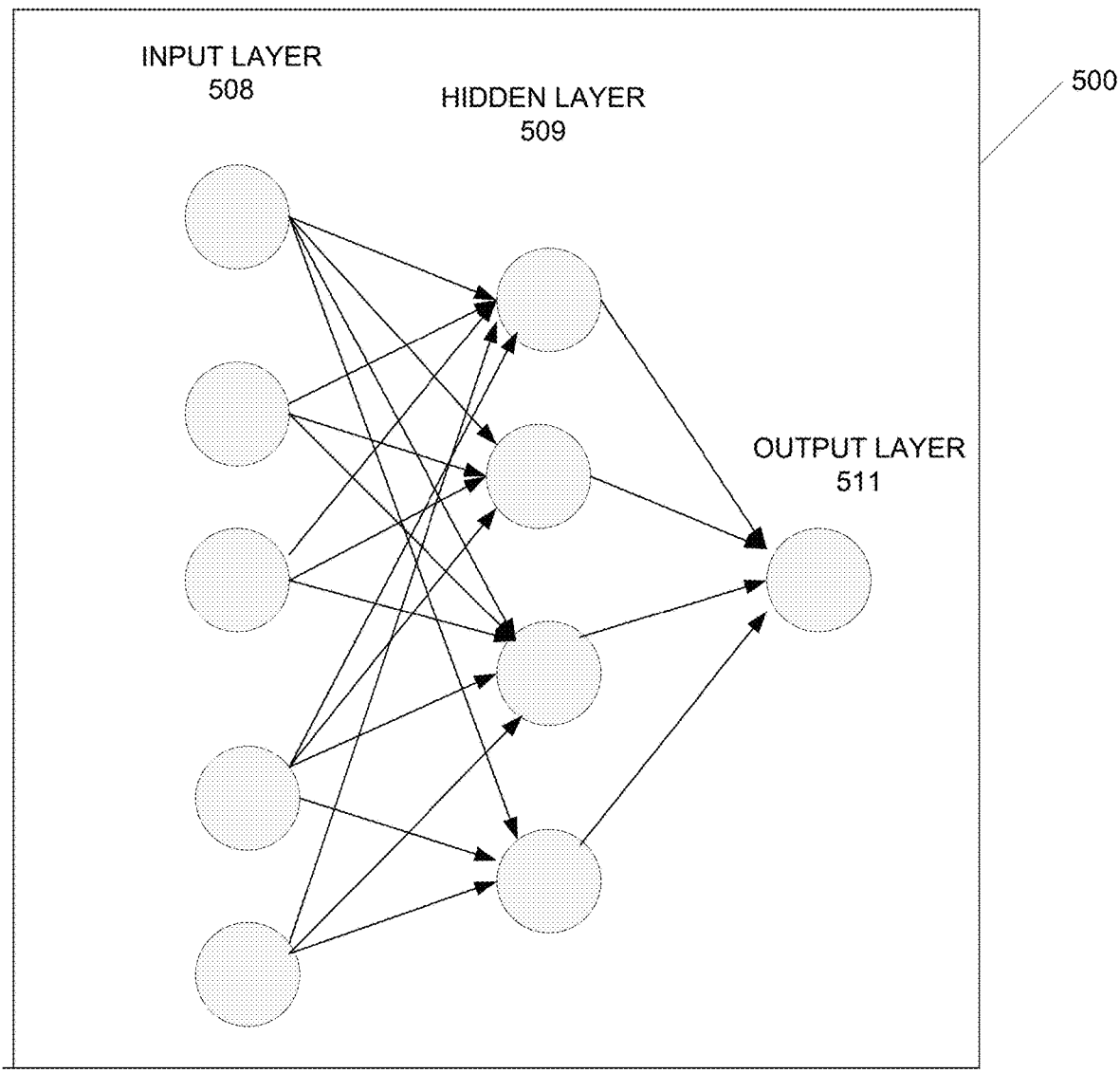
FIG. 5 is an illustrative functional block diagram of a neural network that may be used to implement the processes and functions, in accordance with one or more implementations.

Some aspects of various exemplary constructions are described by referring to and/or using neural network(s). In some implementations of the system and method, the processor(s) may be configured to process the data with a deep machine learning processing module. Machine learning module 308 may be configured to electronically process with a machine deep learning controller. Various structural elements of neural network includes layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. Computer networks 203, 201 may incorporate various machine intelligence (MI) neutral network 500 (see FIG. 5) features of available Tensorflow (https://www.tensorflow.org) or Neuroph software development platforms (which are incorporated by reference herein). Referring to FIG. 5, neural network 500 is generally arranged in "layers" of node processing units serving as simulated neutrons, such that there is an input layer 508, representing the input fields into the network. To provide the automated machine learning processing, one or more hidden layers 509 with machine learning rule sets processes the input data. An output layer 511 provides the result of the processing of the network data.

The computer readable database 316 may include the "attribute data" including ASCII characters in computer readable form or binary complied data. The ASCII characters or binary data can be manipulated in the software of system 300.

With continued reference to FIG. 3, machine learning module 308 implements deep learning machine learning techniques implementing a representation of learning methods that allows a machine to be given raw data and determine the representations needed for data classification. By using deployment of deep learning software to implement processing, the computing system 300 may eliminate overhead to process the plethora of raw data that can overwhelm the enterprise and/or reduce processing overhead to improve push notification response time. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Deep learning ascertains structure in data sets using backpropagation algorithms which are used to alter internal parameters (e.g., node weights) of the deep learning machine. Deep learning machines can utilize a variety of multilayer architectures and algorithms. While machine learning, for example, involves an identification of features to be used in training the network, deep learning processes raw data to identify features of interest without the external identification.

In some implementations, machine learning module 308, deep learning in a neural network environment includes numerous interconnected nodes referred to as neurons. Input neurons, activated from an outside source, activate other neurons based on connections to those other neurons which are governed by the machine parameters. A neural network behaves in a certain manner based on its own parameters. Learning refines the machine parameters, and, by extension, the connections between neurons in the network, such that the neural network behaves in a desired manner.

One of implementations machine learning module 308 include deep learning technology that may utilize a convolutional neural network segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, such as computer system diagrams, rather than looking for an object, it is more efficient to look for edges which form motifs which form parts, which form the object being sought. These hierarchies of features can be found in many different forms of data such as speech and text, etc.

In some implementations, learned observable features include objects and quantifiable regularities learned by the machine during supervised learning. A machine provided with a large set of well classified data is better equipped to distinguish and extract the features pertinent to successful classification of new data. A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given example training dataset.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine learning module 308 has been trained to operate according to a specified threshold, etc.), the machine learning module 308 can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network can provide direct feedback to another process. In certain examples, the neural network outputs data that is buffered (e.g., via the cloud, etc.) and validated before it is provided to another process.

In some implementations, machine learning module 308 may be configured to electronically process with the machine learning controller. Machine learning module 308 may identify the possible time vectors leading to the most probable time to release a push notification so that the notification can be read by the user.

Figure 6:
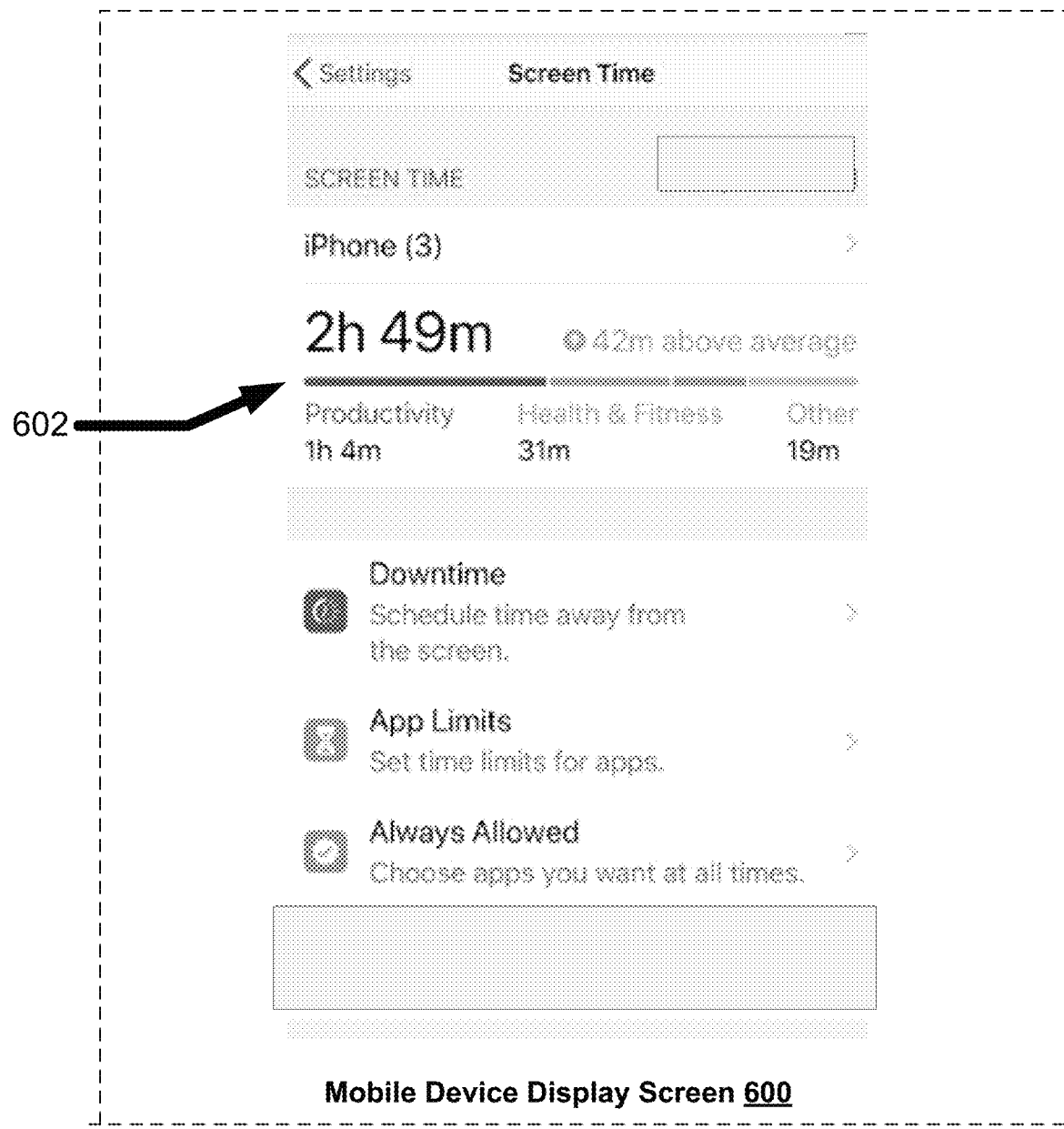
FIG. 6 is an illustrative block diagram of a display screen mobile device that may be used to implement the processes and functions of certain embodiments.

In some implementations, mobile data collection processing module 312 identifies historical data or baseline data stored in computer readable database 316, such that user activities about the phone/application usages are collected over time, such as in one example, electronic behavioral/ gating data. In some implementations, electronic behavioral/gating data can be developed from a number of characteristics, including but not limited to user touch dynamics on the mobile device 700 (e.g., screen swiping behavior on touch sensor 726 on display 722), and user walking/running gait. For the user walking/running gait data, the mobile device may have on-board one of more accelerometer devices that sends data to the electronic behavioral/gaiting software program on the mobile device in module 312. For historical collection use, the module 312 may create a baseline of the user's electronic behavioral/gaiting data over a threshold period of operation for the device, such as 12 hours, 24 hours, two-four days, one week, or two to three weeks or more. This electronic baseline data can be stored in the memory 114 as discussed. In some implementations, the historical data in database 316 may include screen time usages 602 over a threshold period of operation for the device, such as 12 hours, 24 hours, two-four days, one week, or two to three weeks or more, such as productivity time mobile apps, and other type of mobile apps. (see FIG. 6).

In some implementations, the user interaction processing module 320 implements suitable programming algorithms to model possible time vectors in the data set 316 to release a push notification on the mobile device 700. In one implementation, module 320 employs module 308 algorithms so as to understand the user activity or pattern about the mobile usage and appropriate time the notification alert/SMS push, to increase the readability/benefit to the user. In other implementations, user interaction processing module 320 electronically processes the data set collected (database 316) in the data collection processing module 312 with the machine learning module 308 based on a machine learning training data set 324 to create a set of most probable time vectors to display or otherwise release a push notification. Predefined user activity data factors in the training set data 324 may include user interactions with the interested application and with other applications, such that it includes the historical pattern of the application usages/profiles, timing pattern of each application usages and priority of the application usages. Other factors for the training data set 324 may include contextual pattern of application usages, such as the user music listening times (or specific type of music genre, such as, for example, rock, easy listening, country, techno, soul, jazz, blues, Indian, and classical) will have more chance of reading the alert and acting positively on the alert. This helps a promotional type of notification to become read by the user. Other factors for the training data set 324 may include historical information about the notification seen along with the time/interaction with other mobile applications. Yet other factors for the training data set 324 may include the location or travelling profile that can be used to push the appropriate type of push notification. For example, the training data set 324 may have data for promotional activities that should not be pushed during travel or business/office timing where the users have less activity with the mobile device applications. Yet other factors for the training data set 324 may include customer preferences captured through application and historical data status. In one implementation, module 320 may operate in real-time to create an electronic temporary behavioral data for a period of several minutes of operation. This temporary behavioral data can be designated as recent behavior data for authentication use according to the teachings of the present disclosure so that the push notifications can be sent to the normal user of the mobile device and not the current device user.

In some implementations, the machine learning training data 324 may include at least one mobile usage attribute data element. In some implementations, the machine learning training data 324 may include at least one gating attribute data element. In some implementations, the machine learning training data 324 may include at least one music genre attribute data element. In some implementations, the machine learning training data 324 may include at least one screen time attribute data element. In some implementations, the machine learning training data 324 may include at least one location profile attribute data element. In some implementations, the machine learning training data 324 may include at least one traveling profile attribute data element.

In some implementations, module 310 displays the push notification on the mobile device 700, such as on device screen 600. The push notification is created from application server 800 (see FIG. 8). System 300 includes module 310 that sends a push notification based on results of machine learning module 308, wherein the mobile devices can receive inquiries, via an automatic push notification or an electronic mail, text messaging via Short Messaging Service (SMS) component of phone, web, or mobile communication systems 802 (See FIG. 8), using standardized communication protocols that allow the exchange of short text messages between fixed line or mobile phone devices. In another manner, the mobile device 700 receive inquiries via a pull format where the inquirer initiates the query at various steps and the notification can be electronic mail or Short Messaging Service technology for cellular phones.

In some implementations, system 300 may include an electronic messaging element, such as an API for an electronic mail system for notification. In some implementations, the machine learning training data 324 may include a GPS location attribute data element pertaining to a geo-location of the device accessing the network (global positioning system (GPS) data), and including the time of period of the day (e.g., increments of only two, four, or six hours, such morning, afternoon, evening) and other similar data. The GPS location associated with GPS location attribute 330 may have at least the longitude and latitude of the location to linked to a mapping application.

In some implementations, computing platform(s) 302, remote platform(s) 304, and/or external resources 314 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 314 may be operatively linked via some other communication media.

A given remote platform 304 may include one or more processors configured to execute computer program modules. The computer program modules may be configured to enable an expert or user associated with the given remote platform 304 to interface with system 300 and/or external resources 314, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 314 may include sources of information outside of system 300, external entities participating with system 300, and/or other resources. In some implementations, some or all of the functionality attributed herein to external resources 314 may be provided by resources included in system 300.

Computing platform(s) 302 may include electronic storage 316, one or more processors 318, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 316 may comprise non-transitory storage media or a non-transient computer-readable storage medium that electronically stores information. The electronic storage media of electronic storage 316 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 316 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 316 may include one or more virtual storage resources (e.g., cloud storage, a virtual private network, and/or other virtual storage resources). Electronic storage 316 may store software algorithms, information determined by processor(s) 318, information received from computing platform(s) 302, information received from remote platform(s) 304, and/or other information that enables computing platform(s) 302 to function as described herein.

Processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308, 310, and/or 312, and/or other modules. Processor(s) 318 may be configured to execute modules 308, 310, and/or 312, and/or other modules by software; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 320 and/or 322 are illustrated in FIG. 3 as being implemented within a single processing unit, in implementations in which processor(s) 318 includes multiple processing units, one or more of modules 308, 310, 312, 320, and/or 322 may be implemented remotely from the other modules. The description of the functionality provided by the different modules 308, 310, 312, 320 and/or 322 described below is for illustrative purposes, and is not intended to be limiting, as any of modules 308, 310, 312, 320 and/or 322 may provide more or less functionality than is described. For example, one or more of modules 308, 310, 312, 320 and/or 322 may be eliminated, and some or all of its functionality may be provided by other ones of modules 308, 310, 312, 320 and/or 322. As another example, processor(s) 318 may be configured to execute one or more additional modules that may perform some or all of the functionality attributed below to one of modules 308, 310, 312, 320 and/or 322.

Figure 4A:
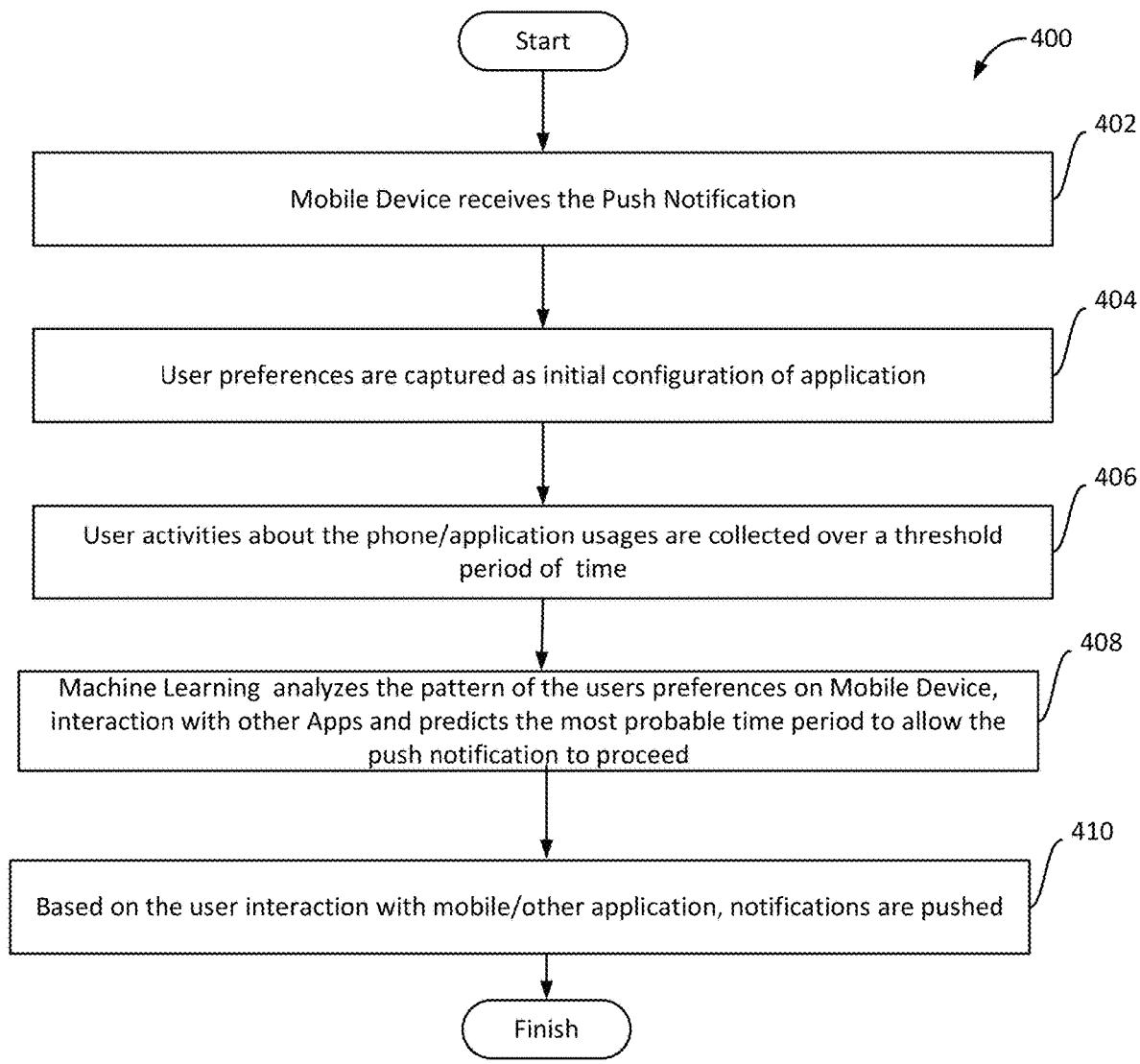
FIGS. 4A and 4B illustrate a method for data communication, in accordance with one or more implementations.

FIGS. 4A and/or 4B illustrate a method 400 for data communication, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A and/or 4B and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4A illustrates method 400, in accordance with one or more implementations. An operation 402 may include notification from an application server is published for an information/promotional alert. Notifications are transmitted or routed to the target or designation application to the mobile device. And the mobile device electronically processes the notification as it's received. The push notifications are held in queue on the mobile device until module 310 allows the release to the target application. Operation 402 may be performed by one or more hardware processors configured by machine-readable instructions including module that is the same as or similar to push notification processing module 310 in accordance with one or more implementations.

An operation 404 may include electronically processing the user entered preferences captured as initial configuration of the mobile applications. Operation 404 may be performed by one or more hardware processors configured by machine-readable instructions including a module that is the same as or similar to processing configuration module 322, in accordance with one or more implementations.

An operation 406 may include electronically processing user data activities about the phone/application usages are collected over time to create a computer readable database 316 including a set of user historical data. Operation 406 may be performed by one or more hardware processors configured by machine-readable instructions including a module that is the same as or similar to mobile data collection processing module 312, in accordance with one or more implementations.

An operation 408 may include electronically processing, with the machine learning controller, with the machine learning based on a training data set 324 to create a set of most probable time vector to release the push notification. Operation 408 may be performed by one or more hardware processors configured by machine-readable instructions including a module that is the same as or similar to user interaction processing module 320 and machine learning module 308, in accordance with one or more implementations.

An operation 410 may include electronically processing, based on the user interaction with mobile/other application, notifications are pushed. Operation 410 may be performed by one or more hardware processors configured by machine-readable instructions including a module that is the same as or similar to user interaction processing module 320, in accordance with one or more implementations.

Figure 4B:
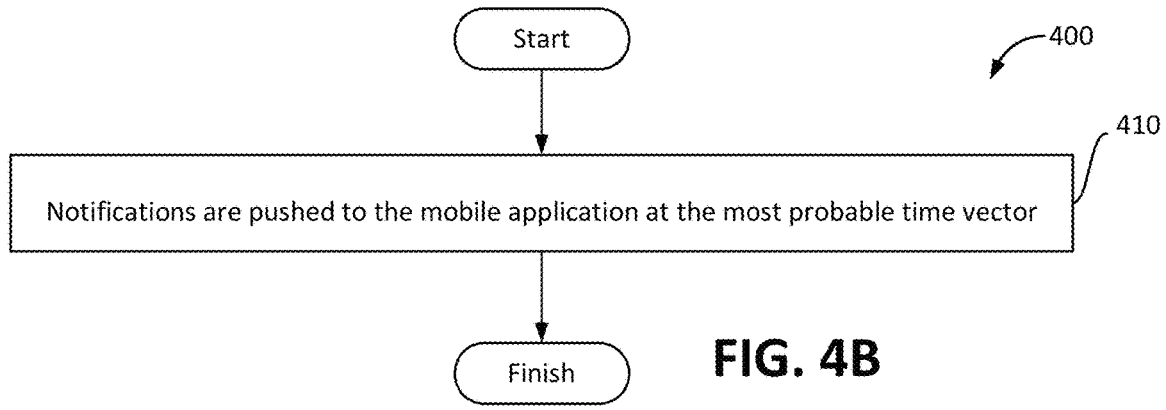

FIG. 4B illustrates method 400, in accordance with one or more implementations. Operation 410 may further include electronically processing, wherein notifications are pushed to the mobile application at the most probable time vector. Operation 410 may be performed by one or more hardware processors configured by machine-readable instructions including a module that is the same as or similar to user interaction processing module 320, in accordance with one or more implementations.

Figure 7:
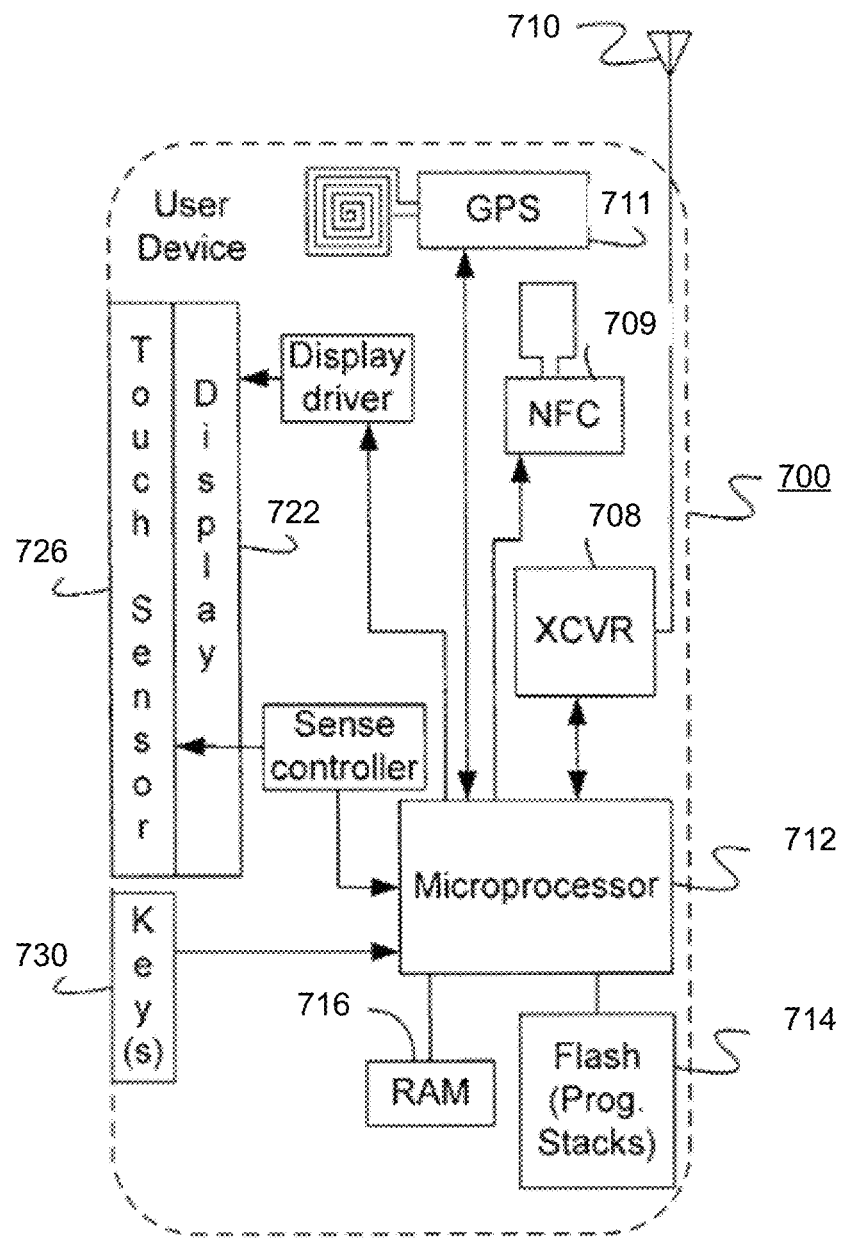
FIG. 7 is an illustrative block diagram of a mobile digital computing environment that may be used to implement the processes and functions of certain embodiments.

FIG. 7 provides a block diagram illustration of an exemplary user device 700. Although the user device 700 may be a smart-phone, a tablet, or another type of device, the illustration shows the user device 700 is in the form of a handset (although many components of the handset, such as a microphone and speaker, are not shown).

Figure 8:
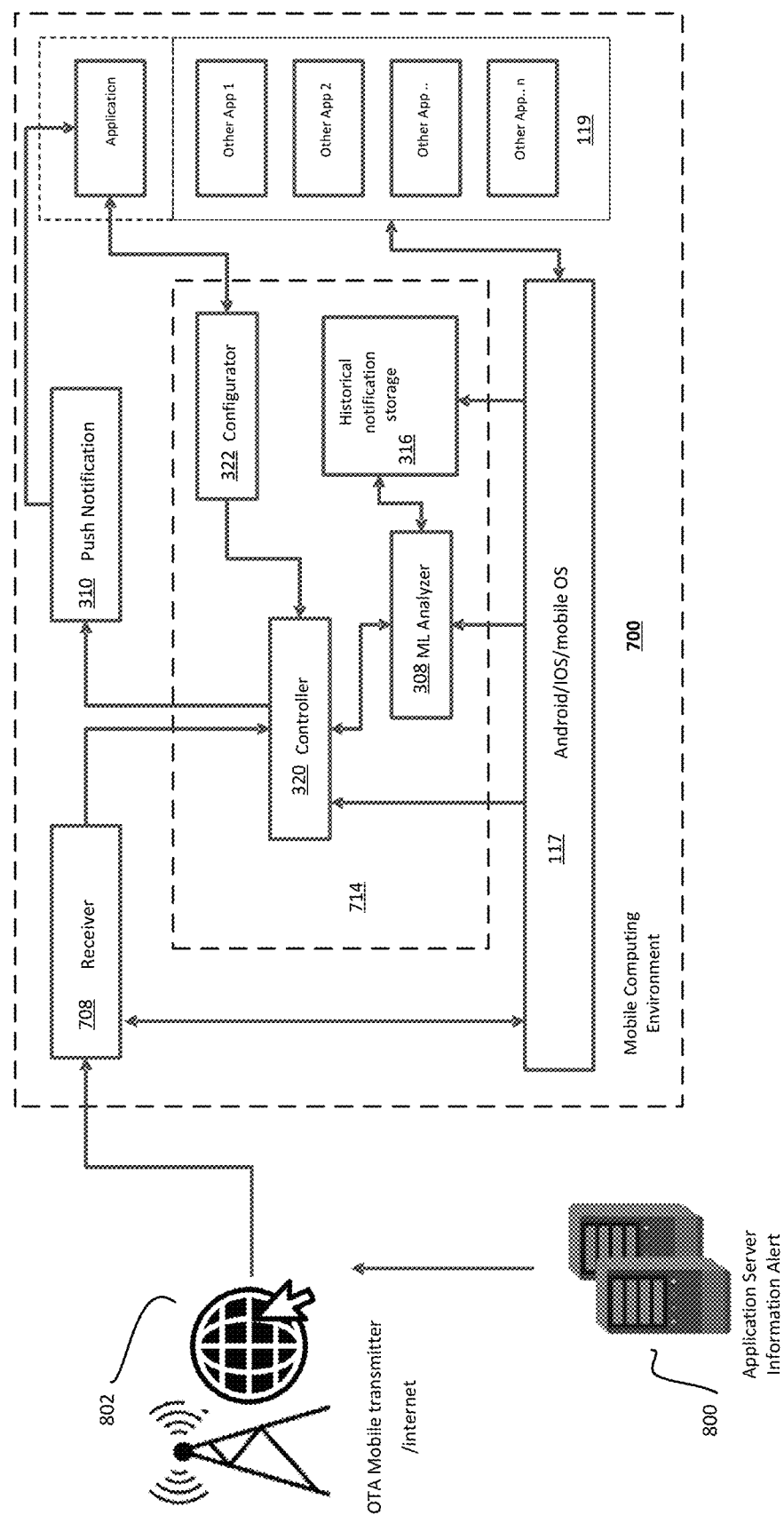
FIG. 8 is an illustrative block diagram of a push notification computing environment that may be used to implement the processes and functions of certain embodiments.

Referring to FIGS. 7 and 8, for digital wireless communications, the user device 700 includes at least one digital transceiver (XCVR) 708 connected to an antenna 710 that receives data packets uploads and downloads using cell tower transmissions with an information alert (e.g., push notification) from an Over-The-Air Transmitter 802. The transceiver 708 provides two-way wireless communication of information, such as digital information, in accordance with the technology of the network 210. The transceiver 708 also sends and receives a variety of signaling messages in support of the various services provided via the user device 700 and the communication network. The user device 700 also includes an NFC interface 709 having an associated antenna and configured for communicating using near-field communication with other devices such as with an NFC reader. The user device 700 includes a display 722 for displaying messages, menus or the like, user related information for the user, etc. A touch sensor 726 and keypad 730 enables the user to generate selection inputs, for example.

A microprocessor 712 serves as a programmable controller for the user device 700, in that it controls all operations of the user device 700 in accord with programming that it executes, for all normal operations, and for operations involved in the real-time parking guidance service. In the example, the user device 700 includes flash type program memory 714, for storage of various program routines and configuration settings. The user device 700 may also include a non-volatile random access memory (RAM) 716 for a working data processing memory. In a present implementation, the flash type program memory 714 stores any of a wide variety of applications, such as navigation application software and/or modules 308, 310, 312, 320, and 322. The memories 714, 716 also store various data, such as input by the user. Programming stored in the flash type program memory 714 is loaded into and executed by the microprocessor 712 to configure the processor 712 to perform various desired functions, including functions involved in push notification processing.

In some examples, the user device 700 further includes a GPS interface 711 coupled to a GPS antenna designed to receive GPS location signals transmitted by satellites. The GPS interface 711 is communicatively coupled to the microprocessor 712, and is operative to provide location information to the microprocessor based on the received location signals.

In one construction, a biometric device system located in Device 700 may be included to enable for securely storing in the device biometric data unique to the user, and/or securely storing in the device behavioral/gating data associated with the user. The electronic biometric data and behavioral/gating data can be maintained, or otherwise stored within a memory/database, such as memory 714 and/or RAM 105 as shown in FIG. 1 in which memory in located within the device (e.g., smart phones).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An electronic computer implemented method of mobile data communication, comprising:
   electronically receiving a plurality of user mobile interaction data and storing the user mobile interaction data in a computer readable database over a threshold period of interaction time associated with a mobile device;
   electronically processing the user mobile interaction data with a machine learning controller based on a set of machine learning training data including predefined user activity data so as to output at least one most probable time vector; and
   electronically outputting the at least one most probable time vector to a notification processing module;
   wherein the set of machine learning training data includes at least one user gaiting behavior attribute data element.

2. The method of claim 1, further comprising electronically receiving a push notification data element and storing the push notification data element in the notification module.

3. The method of claim 1, wherein the machine learning controller comprises a deep machine learning processing module.

4. The method of claim 1, wherein the set of machine learning training data includes at least one mobile usage attribute data element.

5. The method of claim 1, wherein the set of machine learning training data includes at least one GPS location attribute data element.

6. The method of claim 1, wherein the set of machine learning training data includes at least one music genre attribute data element.

7. The method of claim 1, wherein the set of machine learning training data includes at least one screen time attribute data element.

8. The method of claim 1, wherein the set of machine learning training data includes at least one traveling profile attribute data element.

9. A system configured for mobile data communication, the system comprising:
one or more hardware processors configured by machine-readable instructions to:
electronically receiving a plurality of user mobile interaction data and storing the user mobile interaction data in a computer readable database over a threshold period of interaction time for a mobile device;
electronically processing the user mobile interaction data with a machine learning controller based on a set of machine learning training data including predefined user activity data so as to output at least one most probable time vector; and
electronically outputting the at least one most probable time vector to a notification processing module;
wherein the set of machine learning training data includes at least one user gaiting behavioral attribute data element.

10. The system of claim 9, wherein the one or more hardware processors are further configured by machine-readable instructions to electronically receive a push notification data element and storing the push notification data element in the notification module.

11. The system of claim 9, wherein the set of machine learning controller comprises a deep machine learning processing module.

12. The system of claim 9, wherein the set of machine learning training data includes at least one mobile usage attribute data element.

13. The system of claim 9, wherein the set of machine learning training data includes at least one GPS location attribute data element.

14. The system of claim 9, wherein the set of machine learning training data includes at least one music genre attribute data element.

15. The system of claim 9, wherein the set of machine learning training data includes at least one screen time attribute data element.

16. A computing platform configured for mobile data communication, the computing platform comprising:
a non-transitory computer-readable storage medium having executable instructions embodied thereon; and
one or more hardware processors configured to execute the instructions to:
electronically receiving a plurality of user mobile interaction data and storing the user mobile interaction data in a computer readable database over a threshold period of interaction time for a mobile device;
electronically processing the user mobile interaction data with a machine learning controller based on a set of machine learning training data including predefined user activity data so as to output at least one most probable time vector; and
electronically outputting the at least one most probable time vector to a notification processing module;
wherein the set of machine learning training data includes at least one user gaiting behavioral attribute data element.

17. The computing platform of claim 16, wherein the one or more hardware processors are further configured by the instructions to electronically receive a push notification data element and storing the push notification data element in the notification module.

18. The computing platform of claim 16, wherein the machine learning controller comprises a deep machine learning processing module.

* * * * *